United States Patent
Kaplan et al.

(10) Patent No.: US 10,142,309 B2
(45) Date of Patent: Nov. 27, 2018

(54) NO PASSWORD USER ACCOUNT ACCESS

(71) Applicant: Dropbox, Inc., San Francisco, CA (US)

(72) Inventors: Josh Kaplan, San Francisco, CA (US); Adam Cook, San Francisco, CA (US); Stephen Poletto, San Francisco, CA (US); Thomas Wright, San Francisco, CA (US); Luke Faraone, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/577,930

(22) Filed: Dec. 19, 2014

(65) Prior Publication Data

US 2016/0182479 A1   Jun. 23, 2016

(51) Int. Cl.
*H04L 29/06* (2006.01)
*H04L 12/58* (2006.01)
*G06F 21/34* (2013.01)

(52) U.S. Cl.
CPC ............ *H04L 63/08* (2013.01); *G06F 21/34* (2013.01); *H04L 51/046* (2013.01);
(Continued)

(58) Field of Classification Search
CPC ............................... H04L 63/08; H04L 51/046
See application file for complete search history.

(56) References Cited

U.S. PATENT DOCUMENTS 8,627,438 B1 * 1/2014 Bhimanaik ............ H04L 63/10
   726/9
8,739,260 B1 * 5/2014 Damm-Goossens ........................
   H04W 12/06
   726/4

(Continued)

FOREIGN PATENT DOCUMENTS

EP   2 701 415 A1   2/2014
GB      2509045 A   6/2014

(Continued)

OTHER PUBLICATIONS

Shirali-shahreza, et al, Passwordless login system for mobile phones using CAPTCHA, IEEE, Sep. 2007 (Year: 2007).*

(Continued)

*Primary Examiner* — Luu T Pham
*Assistant Examiner* — Harvey I Cohen
(74) *Attorney, Agent, or Firm* — Polsinelli PC

(57) ABSTRACT

Various embodiments of the present technology enable users to sign in to an account without a password. For example, when receiving a request to register a device with an account, a user can be prompted to enter their email address. In response, two tokens are generated. A first token is sent to a client application on the device and the second token is sent to the user's email. The user can then only login to their account with the device if the device has both tokens. Thus, if someone intercepts the email, they will be unable to login from another device since they don't have the first token. If the client token and email token cannot be automatically (Continued)

joined on the same device, a web page showing a code can be displayed on a first device, which can be entered on the second device to finish login process.

20 Claims, 12 Drawing Sheets

(52) U.S. Cl.
CPC ...... *H04L 63/0807* (2013.01); *H04L 63/0853* (2013.01); *H04L 63/0876* (2013.01); *H04L 63/105* (2013.01); *H04L 63/18* (2013.01)

(56) References Cited

U.S. PATENT DOCUMENTS

| | | | | |
|---|---|---|---|---|
| 9,165,291 | B1* | 10/2015 | Andersen | G06Q 20/10 |
| 9,571,282 | B1* | 2/2017 | Aggarwal | H04L 9/32 |
| 2006/0059004 | A1 | 3/2006 | Ussery et al. | |
| 2008/0098464 | A1* | 4/2008 | Mizrah | G06F 21/36 |
| | | | | 726/5 |
| 2010/0235897 | A1 | 9/2010 | Mason et al. | |
| 2012/0124646 | A1 | 5/2012 | Lin | |
| 2012/0278725 | A1* | 11/2012 | Gordon | H04N 21/2665 |
| | | | | 715/738 |
| 2013/0139222 | A1* | 5/2013 | Kirillin | H04L 67/02 |
| | | | | 726/4 |
| 2013/0152176 | A1* | 6/2013 | Courtney | G06F 21/36 |
| | | | | 726/5 |
| 2013/0254856 | A1 | 9/2013 | Krishan | |
| 2014/0157392 | A1* | 6/2014 | Smith | H04L 63/08 |
| | | | | 726/9 |
| 2015/0127547 | A1* | 5/2015 | Powell | G06Q 20/382 |
| | | | | 705/67 |
| 2015/0249540 | A1* | 9/2015 | Khalil | H04L 63/0853 |
| | | | | 713/158 |
| 2016/0192194 | A1* | 6/2016 | Yang | H04W 12/08 |
| | | | | 713/171 |

FOREIGN PATENT DOCUMENTS

| | | |
|---|---|---|
| WO | 2013/059866 A1 | 5/2013 |
| WO | 2014/016619 A1 | 1/2014 |

OTHER PUBLICATIONS

Yoon et al, A New Biometric-based User Authentication Scheme without Using Password for Wireless Sensor Networks, IEEE, Jun. 2011 (Year: 2011).*

Chen et al, New authentication method for mobile centric communications, IEEE, May 2005 (Year: 2005).* http://littlebigdetails.com/post/86569044847/slack-after-changing-your-password-slack-lets.

PCT Search Report and Written Opinion dated Feb. 26, 2016 in realted Application No. PCT/US2015/061984, filed Nov. 20, 2015, entitled, "No Password User Account Access", Applicant Dropbox, Inc., 12 pages.

* cited by examiner

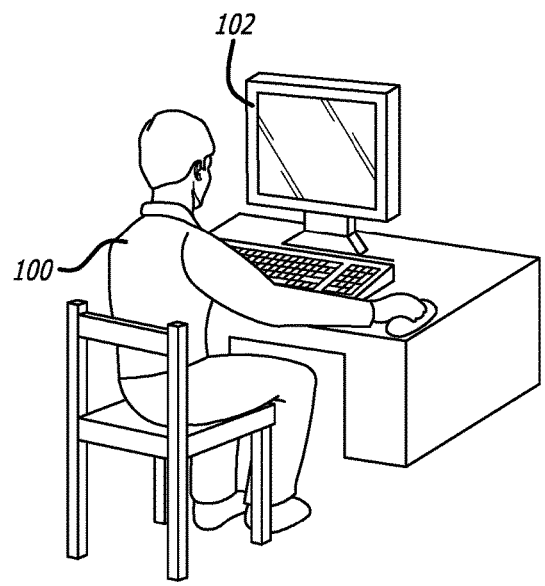
FIG. 1A
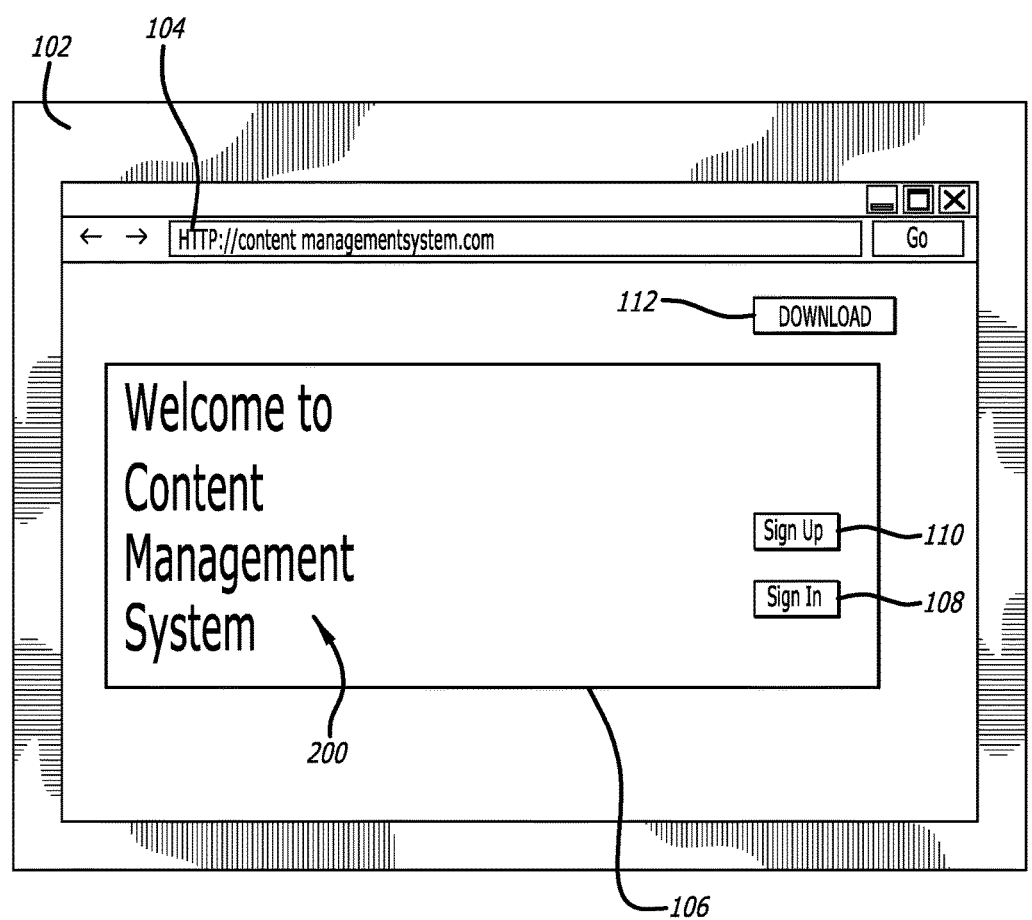

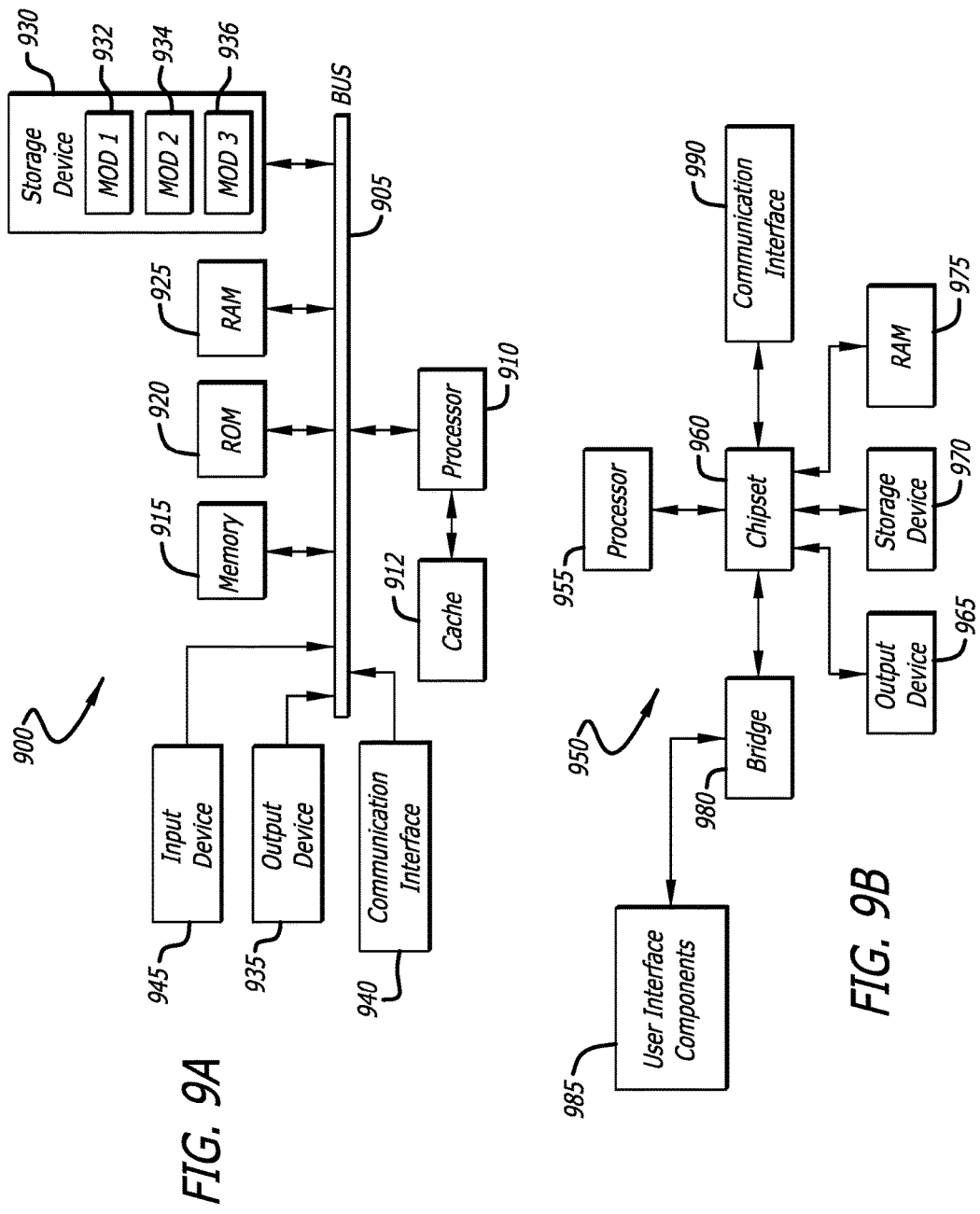

NO PASSWORD USER ACCOUNT ACCESS

TECHNICAL FIELD

The present technology pertains to account access, and more specifically pertains to enabling a user to access a user account without a password.

BACKGROUND

In order to enjoy the services provided by many web-based service providers, users are often required to create a user account. A user account enables information associated with an account to be remotely stored and accessible to a user. For example, a user's payment information can be stored with a user account with an electronic marketplace to enable the user to make purchases without requiring them to re-enter their payment information each time they want to make a purchase. Similarly, a content management system stores content items, such as documents, spreadsheets, digital photos, and the like, to a user account to enable a user to access these content items at their request and to enable them to add new content items. User accounts can, therefore, enable more convenient and efficient access to some services, such as with an electronic marketplace, or be required in order to later access stored information, such as with a content management system.

A user must first register with a web-based service provider and setup a user account to enjoy these benefits. Setting up a user account, however, can be time consuming. For example, setting up a user account can include choosing a username and password and providing information, such as their shipping and billing addresses, payment information, and other preferences. This may also include downloading and installing software, confirming information via an email or text message, and the like. Thus, setting up a new user account can be cumbersome and take time. Some users, however, are too busy or may not foresee themselves utilizing a respective web-based service to an extent that justifies them taking the time to setup a new account. Many of these users, after being provided access to a respective web-based service, may actually utilize the service more than they initially anticipated, however, the initial setup or registration friction associate with creating a new user account may operate as a deterrent.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for creating a new user account without requiring a cumbersome registration or setup process. For example, in order to enable convenient access to a new user account with a web-based service, a user may download and install a client application for the web-based service on their computing device when the account could otherwise be accessed through a web page. Thus, upon installing the client application, the user must register the client application with the web-based service to link or associate the client application and, by extension, the computing device with an existing account. If the user does not have an existing account, they can use the client application to create one.

In either instance, the user will be required to provide some identifying information, which often includes a username and password for existing accounts and the user's name and email address before they are prompted to choose a username and password. Depending on the type of account, this process can take time.

Accordingly, in an attempt to reduce account creation and sign-in barriers, a user can be prompted to enter their email address when requesting to register a device at login or when creating a new account. In one instance, if the user is creating a new account, they could simply be provided access to a new account upon providing their email address. Subsequently, upon signing into the account from a different device, the user would again be prompted for their email address. In this instance, two tokens are generated: a client device token and an email token. The client token is sent to the new device and the email token is sent to the user's email address. Accessing the email containing the email token on the same new device associates the email token with the new device and together, with the client token, enables access to the user account. Thus, the user can only login to their account with the new device if the device is in possession of both tokens.

If someone intercepts the email, they will be unable to login from another device since they don't have the client device token. If the client token and email token cannot be automatically joined (by intercepting the link click from the client on the same platform), a web page showing a code can be displayed to the user on the first device. This code can then be entered on the second device to finish login process and enable the user to access the user account on the second device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1A shows an example of a user signing in or signing up for a user account and accessing a user account via a computing device;

FIG. 9A shows a conventional system bus computing system architecture; and

FIG. 9B shows a computer system having a chipset architecture.

DESCRIPTION

Figure 1B:
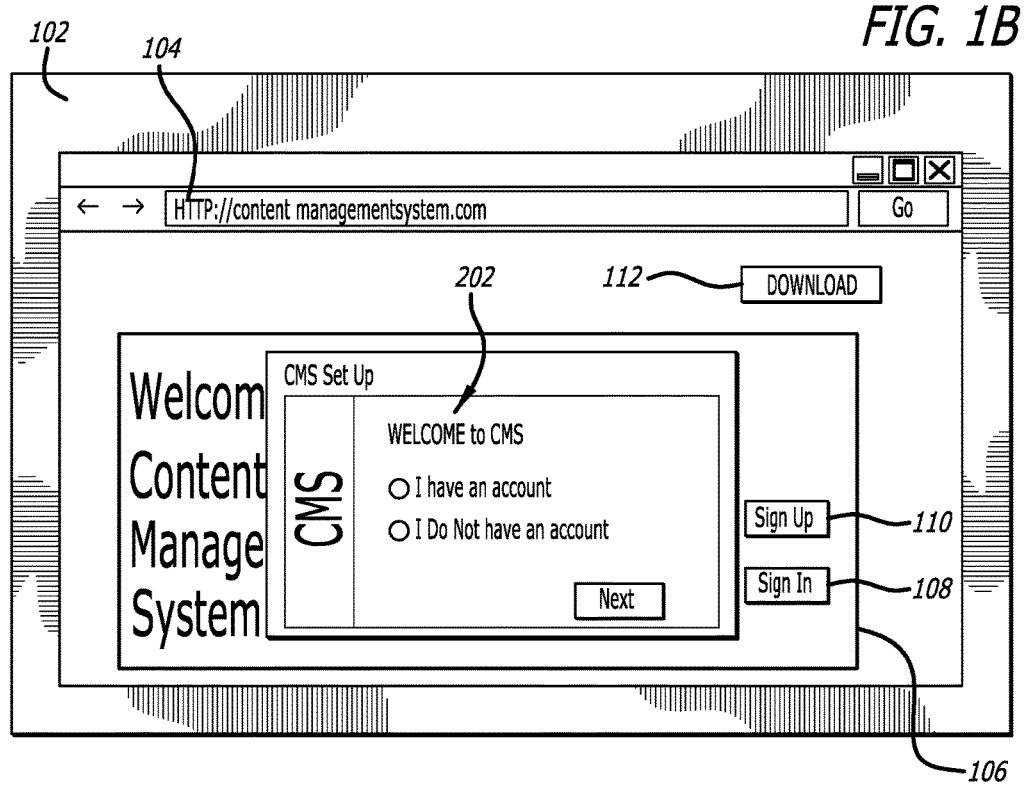
FIGS. 1B-1C show example screenshots corresponding to a method for signing in or singing up for a user account with a web-based service.

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for a method that enables passwordless access to a user account without sacrificing security. FIG. 1A shows an example screenshot of computing device 102 wherein user 100 is attempting to sign in 108 to an existing account or sign up 110 for a new account with content management system (CMS) 200. Although computing device 102 is shown as a desktop computer, it should be understood that various other types of electronic or computing devices that are capable of determining and processing input can be used in accordance with various embodiments discussed herein. These devices can include, for example, smart phones, tablet computers notebook computers, personal data assistants, smartwatches, phablets, electronic book readers, video gaming consoles or controllers, televisions or smart televisions, and portable media players, among others.

In one example, CMS 200 provides remote or cloud access to content items from multiple computing devices each associated with a single user account. In order to enable access to the same content item from each of these devices, the CMS 200 and each computing device associated with an account maintains a local copy of each content item. Changes made to one content item on one device are sent to CMS 200, which then causes each of the other devices associated with the user account to sync the respective content item with the updated version stored with the CMS 200. In order to enable this syncing process, each of the computing devices includes a client application that communicates with the CMS 200 to maintain up-to-date versions or copies of each content item.

In order to download and install the client application, user 100 navigates to webpage 106 for CMS 200 via web browser 104. In one example, user 100 could already have an account with CMS 200, but downloads the client application because computing device 102 is new. Thus, user 100 installs the client application to associate their new computing device with their account by selecting download 112 to initiate a process for downloading and installing the client application. Thus, upon installing the client application, the user must register the client application with CMS 200 to link or associate the client application and, by extension, computing device 102 with the existing account.

Figure 1C:
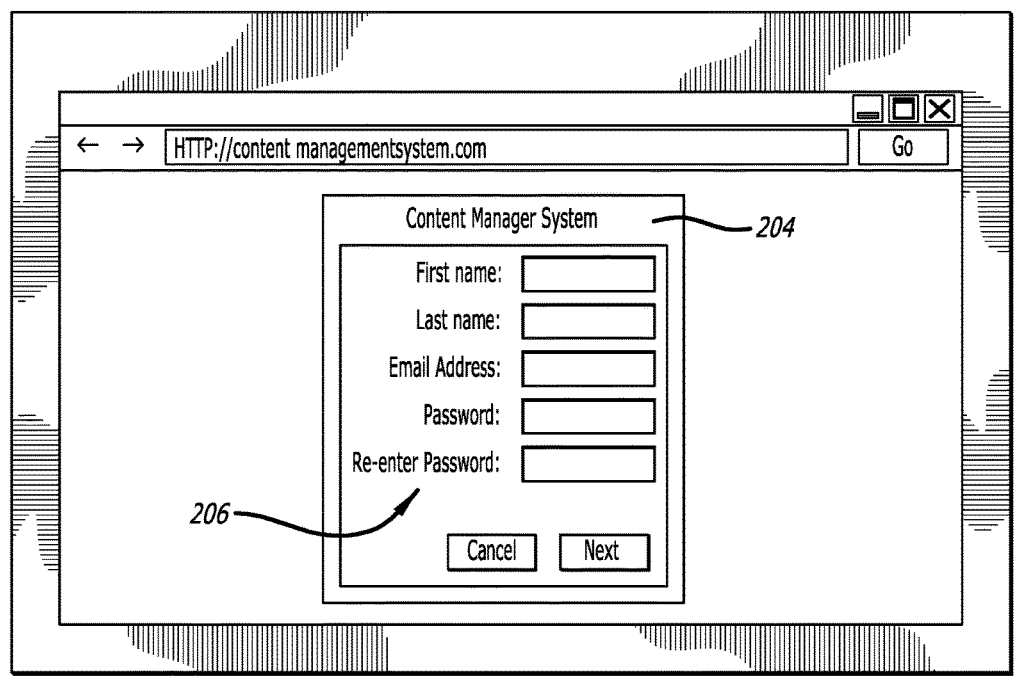

Accordingly, FIG. 1B shows an example screenshot of computing device 102 wherein user 100 is prompted 202, after the client application has been downloaded, as to whether they have an existing account or whether they wish to create a new account. If user 100 has an existing account, they will be prompted to sign in with a username or email address and password for the account. Alternatively, if user 100 does not have an existing account, they will be prompted to provide identifying information to create one. For example, FIG. 1C shows a screenshot of computing device 102 wherein setup wizard 204 has been launched to guide user 100 through a setup and configuration process to create a new account. In this example, setup wizard 204 includes text fields 206 for the user to enter the identifying information, such as their first and last name, email address, and two fields that enables user 100 to choose and reenter a password for their new account.

Figure 2:
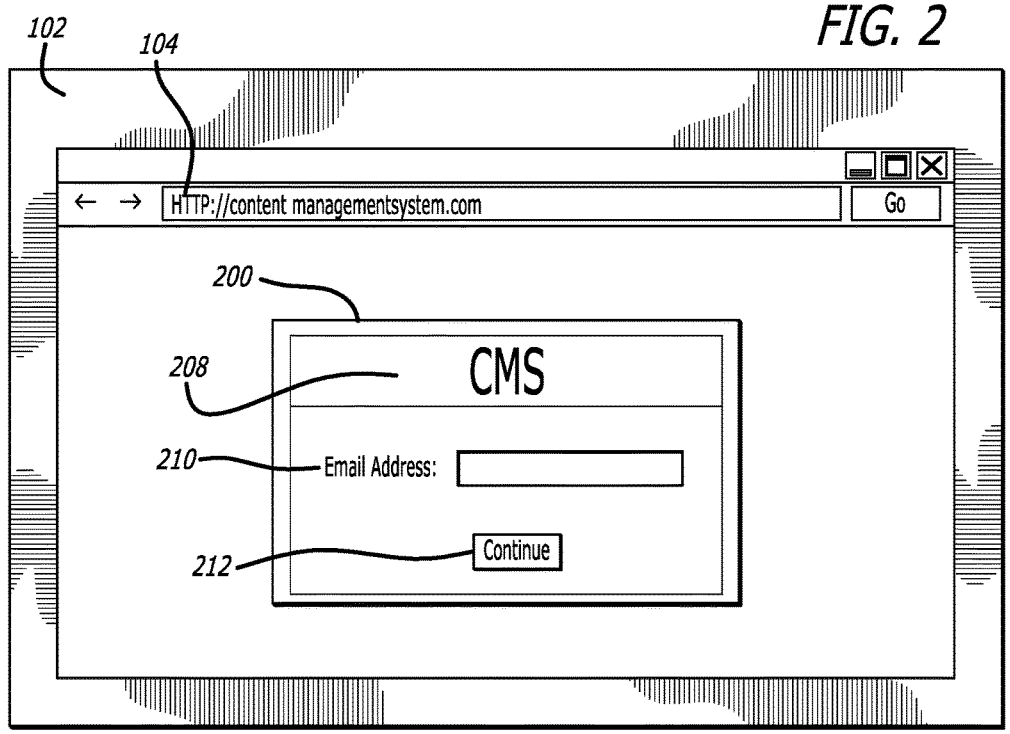
FIG. 2 shows an example screenshot wherein a user is prompted for an email address to generate a passwordless account in accordance with at least one embodiment.

Whether user 100 is creating a new account or registering a new device to an existing, this process takes time and may, thus, operate as a deterrent to some users who do not want to take the time required to sign up for a new account. Accordingly, in an attempt to reduce account creation and sign-in barriers, a user can be prompted to enter their email address when requesting a device at login, as shown in FIG. 2. FIG. 2 shows an example screenshot wherein user 100 is prompted by prompt 208 to enter an email address into text field 210 to generate a passwordless account in accordance with at least one embodiment. In this example, user 100, who does not have an account with CMS 200, simply enters their email address into text field 210 and selects 'Continue' 212 to create an account. Upon receiving the email address, CMS 200 determines that there is no existing account associated with the email address and provides user 100 with immediate access to a new passwordless account.

Accordingly, when user 100 attempts to access the passwordless account after the initial login, whether from a computing device that they have not accessed the account with before or with computing device 102, CMS 200 generates two tokens. A first token is sent to the newly downloaded client application on computing device 102 or a web browser and a second token is emailed to the email address first entered into text field 210 that was used to initially generate the account for authentication. Accordingly, user 100 must be in possession of both tokens in order to access the account.

Figure 3A:
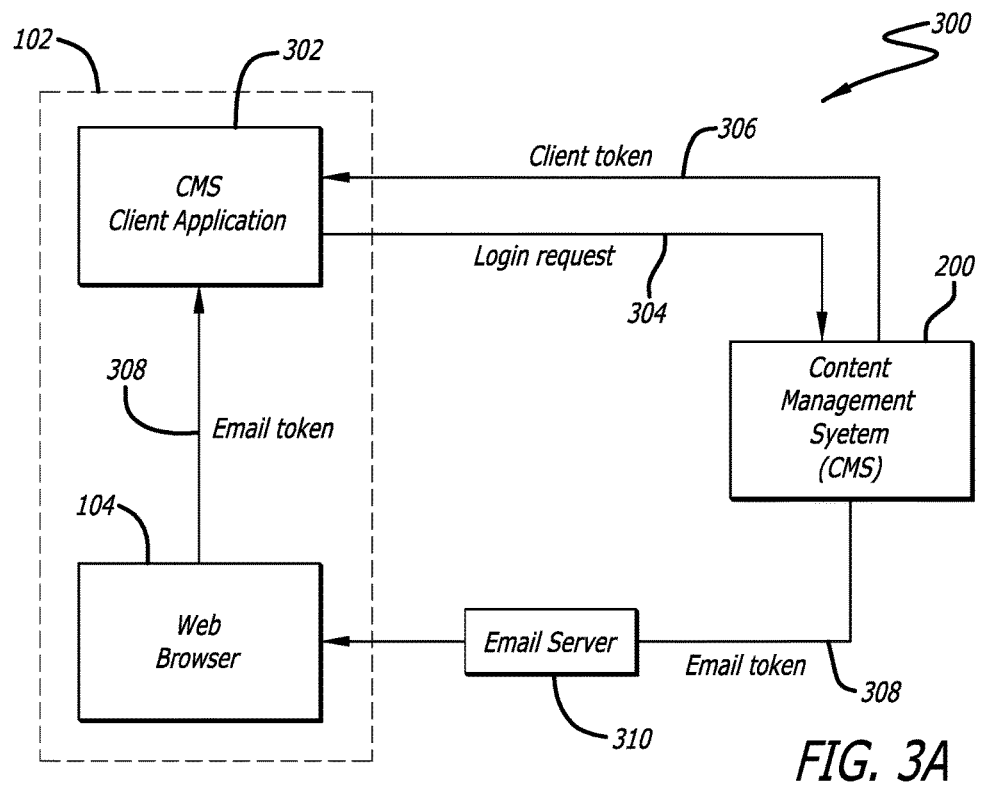
FIG. 3A shows an example transfer of information between a computing device and a content management system in accordance with at least one embodiment.

FIG. 3A shows information transfer 300 between computing device 102 and CMS 200 in accordance with at least one embodiment. In this example, user 100 downloads and installs client application 302 on computing device 102. In one example, CMS 200 provides remote access to content items from multiple computing devices that are each associated with the user account. In order to enable access to the same content item from each of these devices, CMS 200 and each computing device maintains a local copy of the content items. Changes made to one content item on one device are sent to CMS 200, which then causes each of the other devices to sync the content item with the updated version stored with CMS 200. In order to enable this syncing process, each of the computing devices includes a client application (i.e., client application 302) that communicates with CMS 200 to maintain up-to-date versions or copies of each content item. Thus, for each new device a user wants to associate with their account, they must first download and install a client application for CMS 200. It should also be understood that, instead of a separate client application 302, the client application could be a web browser though which a website for CMS 200 is accessed. In this example, the web browser would not perform a synchronization process, but instead access the account directly from CMS 200.

Accordingly, user 100 is provided with access to a new account upon the email address being entered into email address text field 210. However, upon attempting to access the user account at a later time, an authentication procedure is performed. In this example, login request 304 is sent and CMS 200 determines that there is an existing account associated with the user's email address and, in response, generates client token 306 and email token 308. Client token 306 is sent to client application 302, in this example, and email token is sent in an email to user 100 via email server 310. In this example, user 100 accesses email token 308 through web browser 104 upon checking their email. Since user 100 checks their email on computing device 102 (i.e., the same device from which login request 304 was received), email token 308 is sent from email server 310 to client application 302 via web browser 104.

Figure 3B:
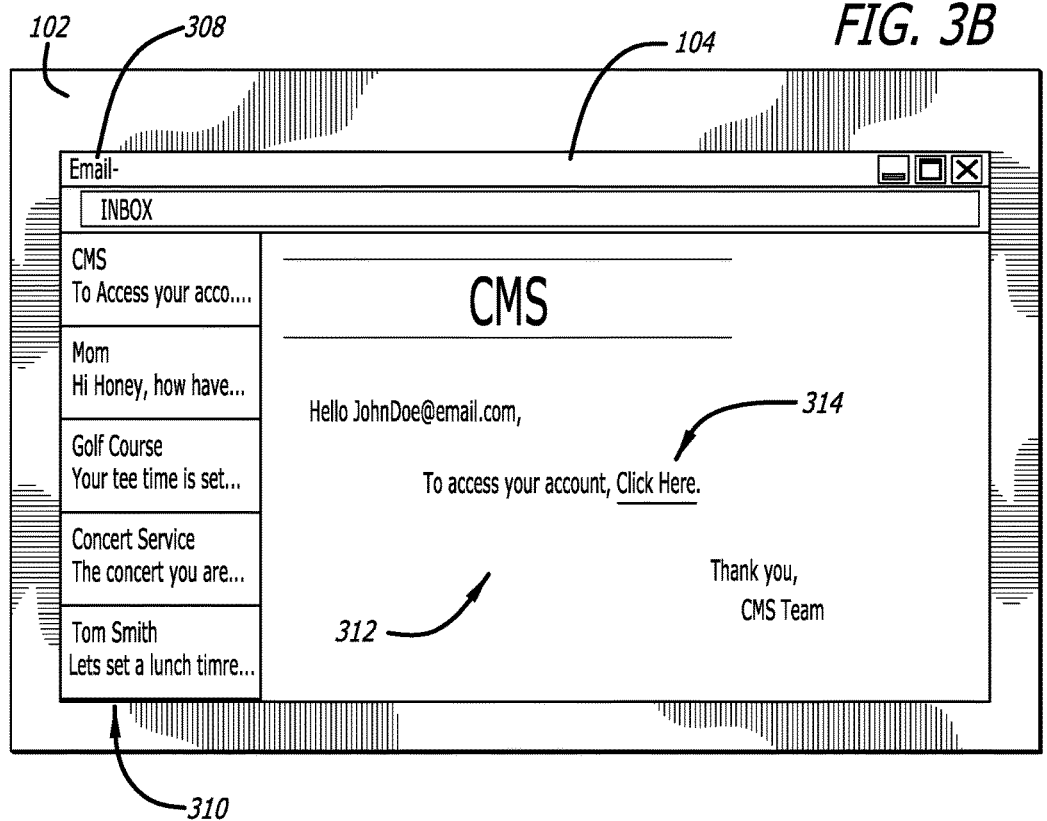
FIGS. 3B-3C show example screenshots corresponding to a passwordless method for signing in to or singing up for a user account with a web-based service in accordance with at least one embodiment.

FIG. 3B shows an example screenshot wherein user 100 is accessing email 312 that contains email token 308 on computing device 102 in accordance with at least one embodiment. In this example, email 312 is addressed to the user's email address (since no other information was required to create the account) and includes 'Click Here' hyperlink 314. Accordingly, when user 100 accesses email 312 and clicks or selects hyperlink 314, email token 308 is sent from email server 310 to client application 302. Thus, upon selecting hyperlink 314, user 100 is redirected from web browser 104, where email 312 is displayed, to a user interface for client application 302, in one example.

Accordingly, after the initial account access session where the account was created, CMS 200 provides user 100 with access to the user account only when both client token 306 and email token 308 are provided in the request. If one of client token 306 or email token 308 is missing, user 100 will not be able to access the user account on a device from which a deficient token request was made. Thus, if email 312 is intercepted by another user, they will be unable to login to the user account from another device since they don't have client token 306.

Figure 3C:
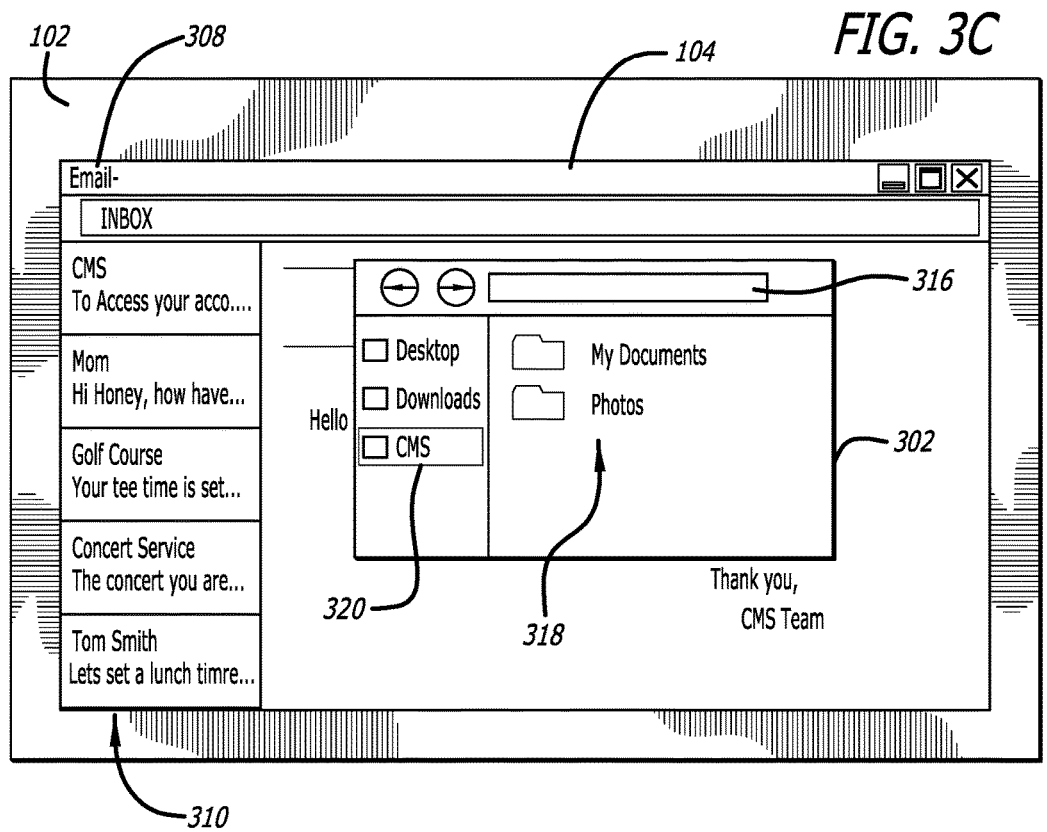

FIG. 3C shows an example screenshot wherein user 100 has accessed email token 308 from email 312, obtained access to the user account, and been redirected to file folder user interface 316 in accordance with at least one embodiment. In this example, client application 302 is associated with or represented visually by icon 320 accessible through the file folder system of computing device 102. Thus, upon selecting icon 320, user 100 can access content items or folders 318 containing content items stored in their user account from file folder user interface 316. Although this example is directed to creating a new account, this process can also be used when associating or registering a new device to an existing account.

Figure 4A:
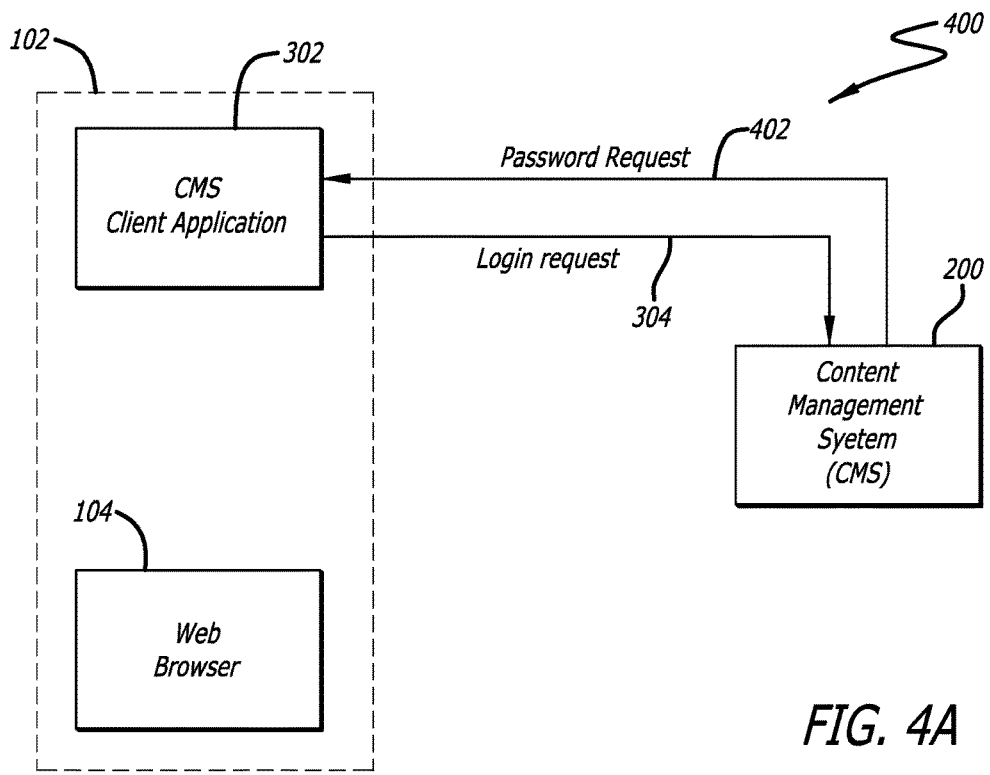
FIG. 4A shows another example transfer of information between a computing device and a content management system to sign into an existing account in accordance with at least one embodiment.

Referring back to FIG. 2, upon downloading and installing client application 302 on computing device 102, if user 100 already has a user account with CMS 200 and the account is classified as a password account, user 100 can enter their email address into text field 210, select 'Continue' 212, and be subsequently prompted to enter their password, as discussed with respect to FIGS. 4A-4B. In this example, FIG. 4A shows example information transfer 400 between computing device 102 and CMS 200 to sign into an existing account in accordance with at least one embodiment. In this example, computing device 102 is a new device, but user 100 has an existing account with CMS 200 and is associating computing device 102 with their account. In this example, upon installing client application 302, user 100 is presented with prompt 208, as shown in FIG. 2. Upon receiving the user's email address, CMS 200 determines whether the email address is associated with an existing account and, if the email address is associated with an existing account, whether the existing account is a password account or a passwordless account.

Figure 4B:
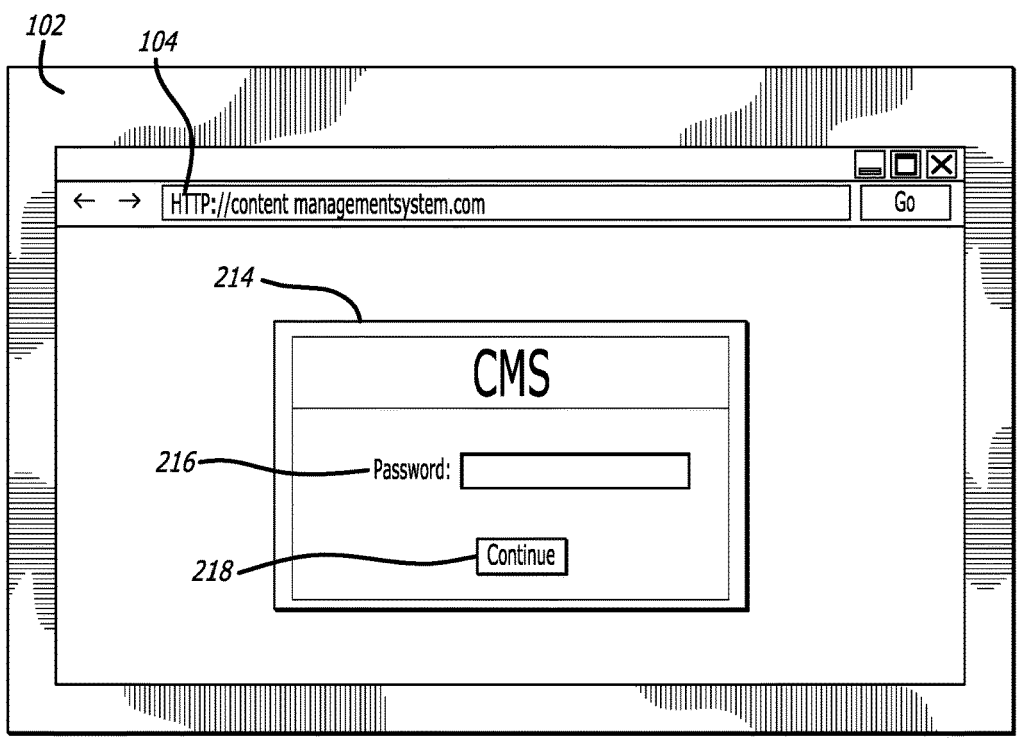
FIG. 4B shows example screenshot to sign into an existing account in accordance with at least one embodiment.

FIG. 4B shows an example screenshot enabling user 100 to enter password 216 for signing into an existing account in accordance with at least one embodiment. In this example, CMS 200 determines that user account is a password account and responds to login request 304 by sending password request 402 in the form of password prompt 214. Thus, user 100 can enter password 216 via password prompt 214 and select 'Continue' 218 to access their account.

In one example, prompt 208 could be a default prompt upon any user downloading and installing client application 302 on any computing device whether they are creating a new account or associating a new device with an existing account. In this way, current users of CMS 200, who have legacy password accounts, could continue to use their existing accounts without change. Some of these users, however, may choose to transform their password accounts to passwordless accounts. Thus, if the user is creating a new account, the process discussed with respect to FIGS. 3A-3C could be used and, if the user is associating a new computing device with an existing account, the process discussed with respect to FIGS. 4A-4B could be used.

Figure 5A:
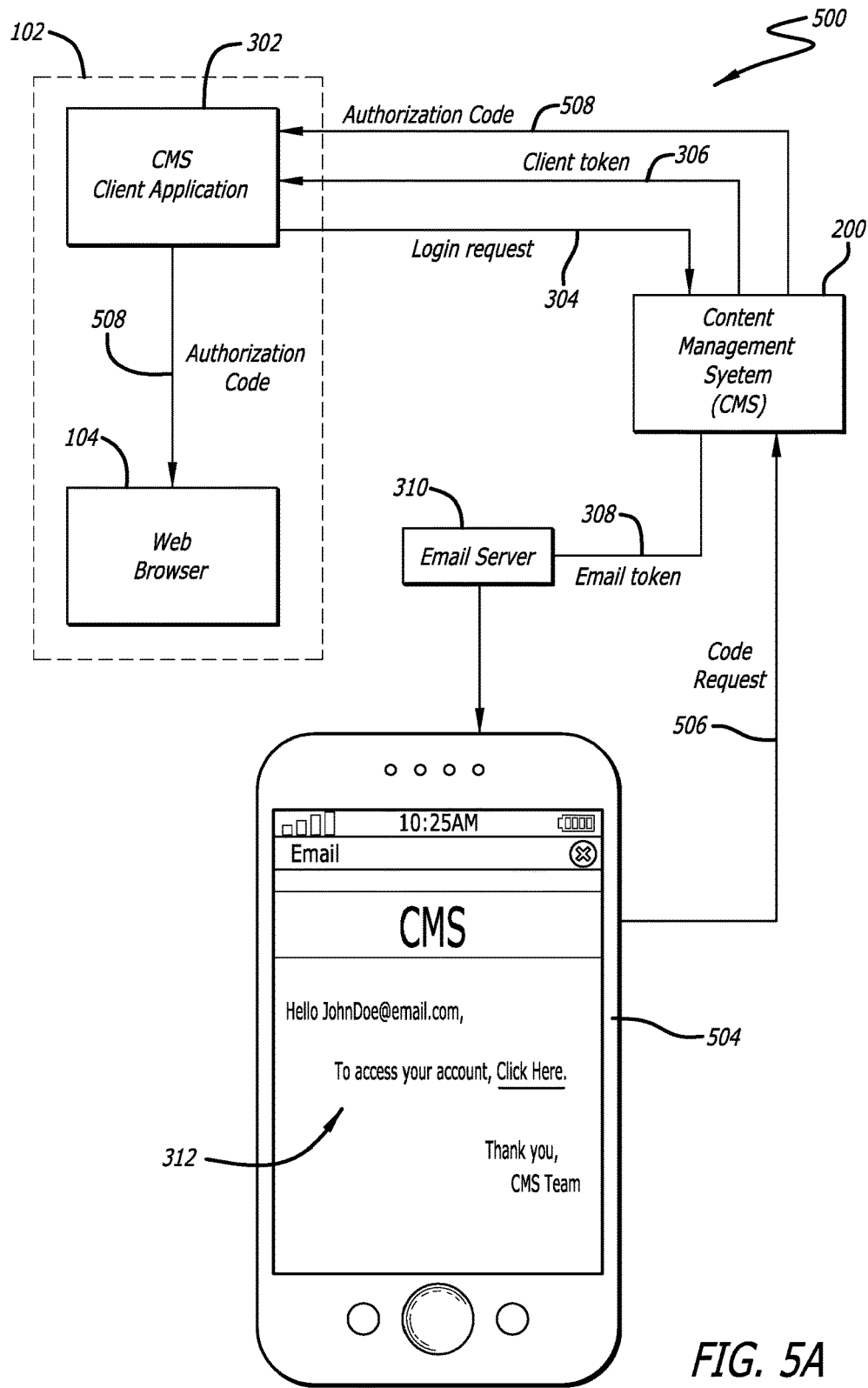
FIG. 5A shows another example transfer of information between a first computing device, a content management system, and a second computing device to sign into a passwordless account in accordance with at least one embodiment.

FIG. 5A shows another example information transfer 500 between computing device 102, CMS 200, and second computing device 504 to sign into a passwordless account in accordance with at least one embodiment. FIG. 5A describes a situation wherein user 100 accesses email 312 from a different computing device from which they made the initial request (i.e., a device that does not have client token 306). In this example, user 100 downloads and installs client application 302 on computing device 102 and, upon submitting their email address, as described above with respect to FIG. 2, login request 304 is sent to CMS 200, as described with respect to FIG. 3A. As similarly described above, CMS 200 determines that there is no existing account associated with the user's email address and, in response, generates client token 306, which is sent to client application 302, and email token 308, which is sent to the user's email address.

In this example, however, user 100 accesses email 312 on computing device 504. FIG. 5A shows email 312 displayed on computing device 504. Since computing device 504 does not possess client token 306 (because it was sent to computing device 102), user 100 (or another user that has accessed the email account belonging to user 100), will be unable to access the account at this point. In order to enable user 100 to access the user account on computing device 504 in legitimate circumstances, a notification or code request 506 is sent to CMS 200 from computing device 504 when user 100 selects 'Click Here' hyperlink 314 in email 312, thereby, accessing email token 308. When code request 506 is received, CMS 200 generates and sends authorization code 508 to first computing device 102 for display that, when entered on second computing device 504, provides second computing device 504 with access to the user account. In this example, once received by first computing device 102, authorization code 508 is received by client application 206 and sent to web browser 104 for display.

Figure 5B:
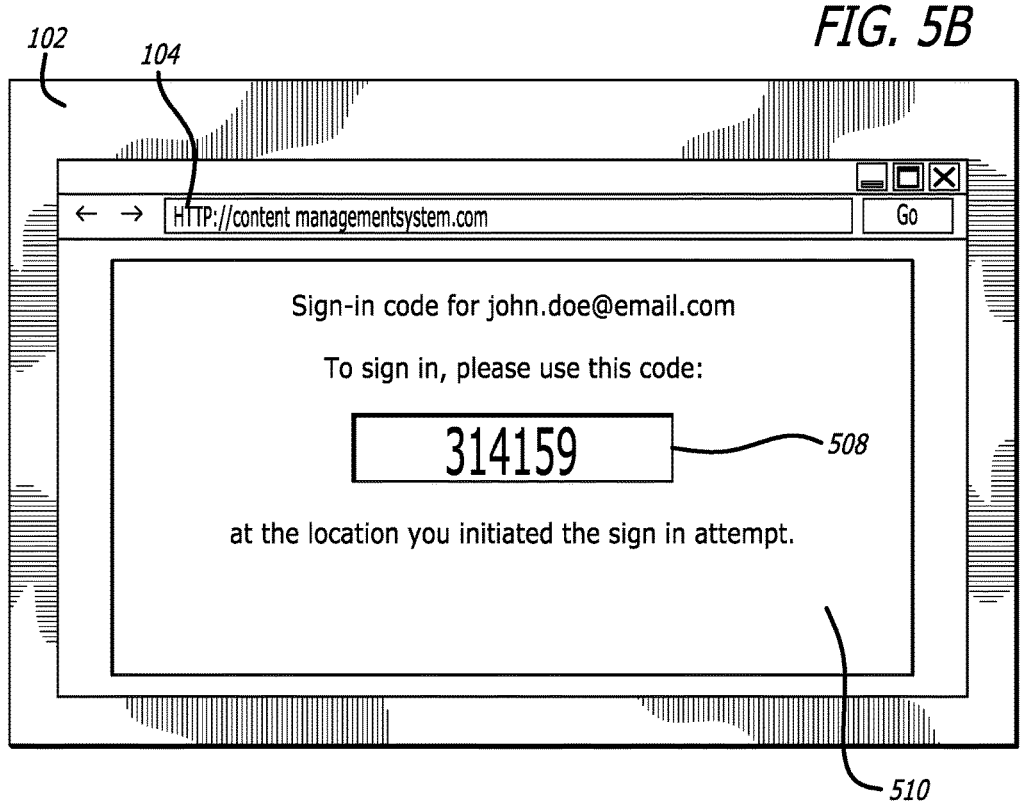
FIG. 5B shows an example screenshot of the first computing device from FIG. 5A for enabling the second computing device to sign into a passwordless account in accordance with at least one embodiment.

FIG. 5B shows an example screenshot of first computing device 102 displaying authorization code 508 on webpage 510 for second computing device 504 to sign into a passwordless account in accordance with at least one embodiment. Accordingly, once received from CMS 200, client application 302 sends authorization code 508 to web browser 104 for display. In this example, authorization code 508 is a numerical code "314159," which, if entered on second computing device 504, will enable user 100 to access the user account on second computing device 504. Thus, in this example, webpage 510 displayed on computing device 102 is shown displaying authorization code 508 with instructions to user 100 to enter authorization code 508 on second computing device 504 if they are attempting to access the user account.

Figure 5C:
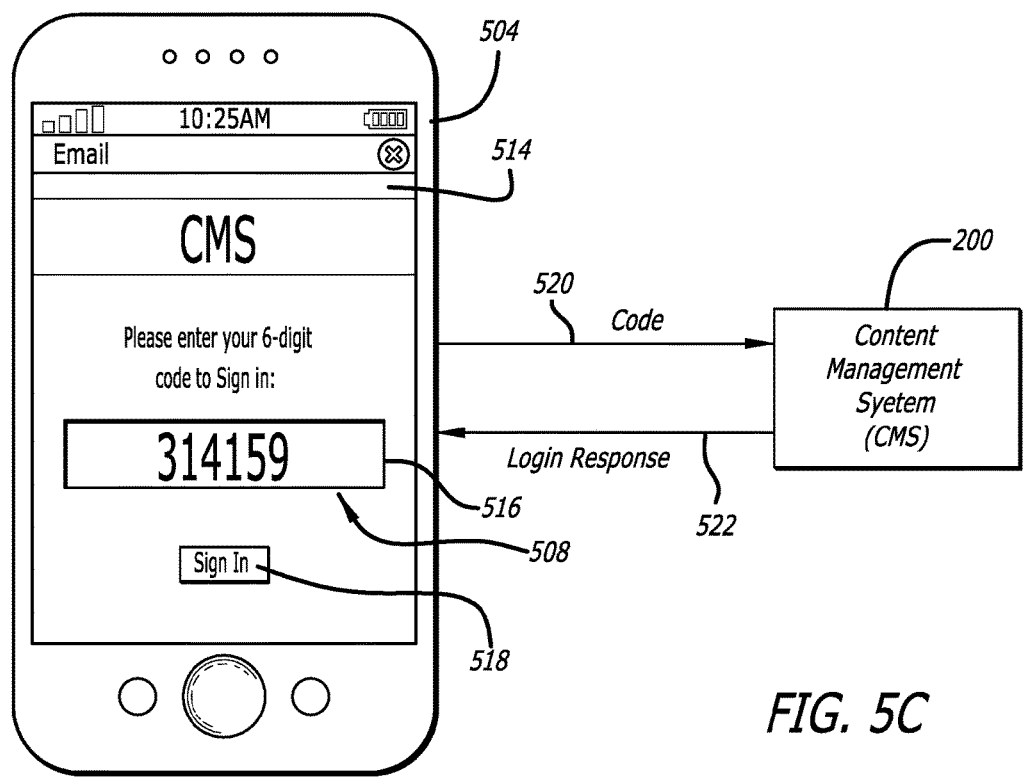
FIG. 5C shows another example transfer of information between the second computing device and the content management system from FIGS. 5A-5B to provide the second computing device with access to a passwordless account in accordance with at least one embodiment.
Figure 5D:
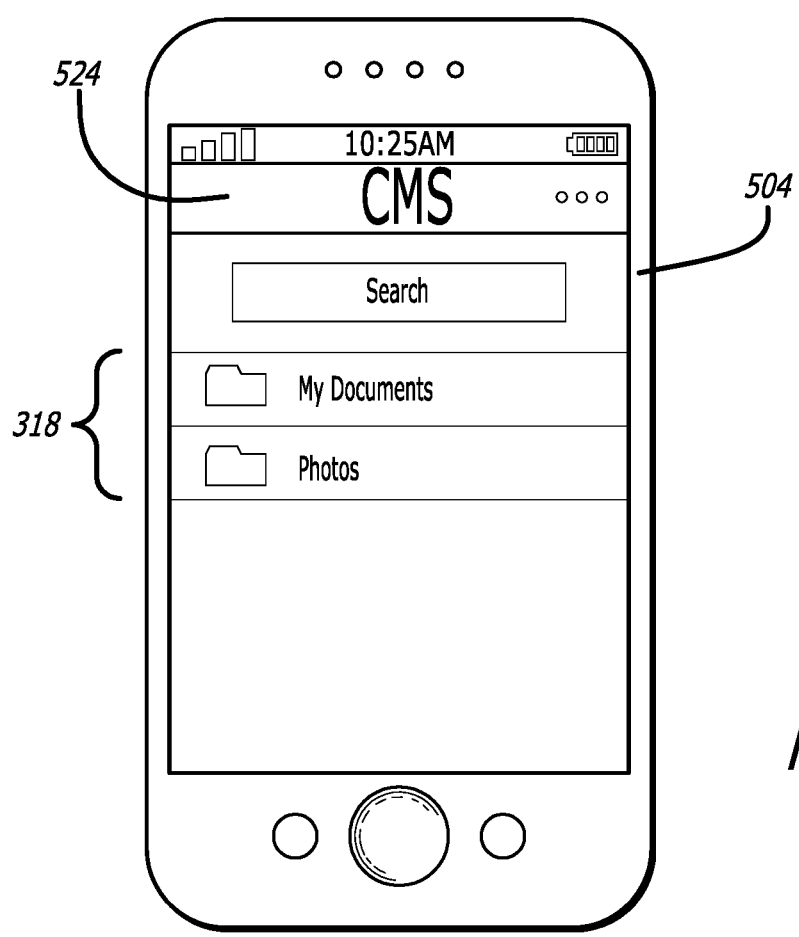
FIG. 5D shows example content from the passwordless account displayed on the second computing device from FIGS. 5A-5C in accordance with at least one embodiment.

FIG. 5C shows a transfer of information between second computing device 504 and CMS 200 in accordance with at least one embodiment. In addition to sending code request 506, upon selecting 'Click Here' hyperlink 314 in email 312 on second computing device 504, user 100 is redirected to CMS webpage 514. In this example, CMS webpage 514 includes text field 516 for user 100 to provide or type in authorization code 508. Accordingly, if user 100 wants to access their user account on their phone, tablet, or a public computer, for example, they can access email 312 on that respective device while near computing device 102 so that they can see authorization code 508 displayed thereon. Once authorization code 508 is entered into text field 516 of CMS webpage 514 and user 100 selects "Sign In" 518, authorization code 508 is sent to CMS 200 for verification. If the code entered by user 100 corresponds to authorization code 508, CMS 200 sends login response 522 to enable computing device 504 to access the user account. Accordingly, FIG. 5D shows example content 318 from user account 524 displayed on second computing device 504 in accordance with at least one embodiment.

Figure 6:
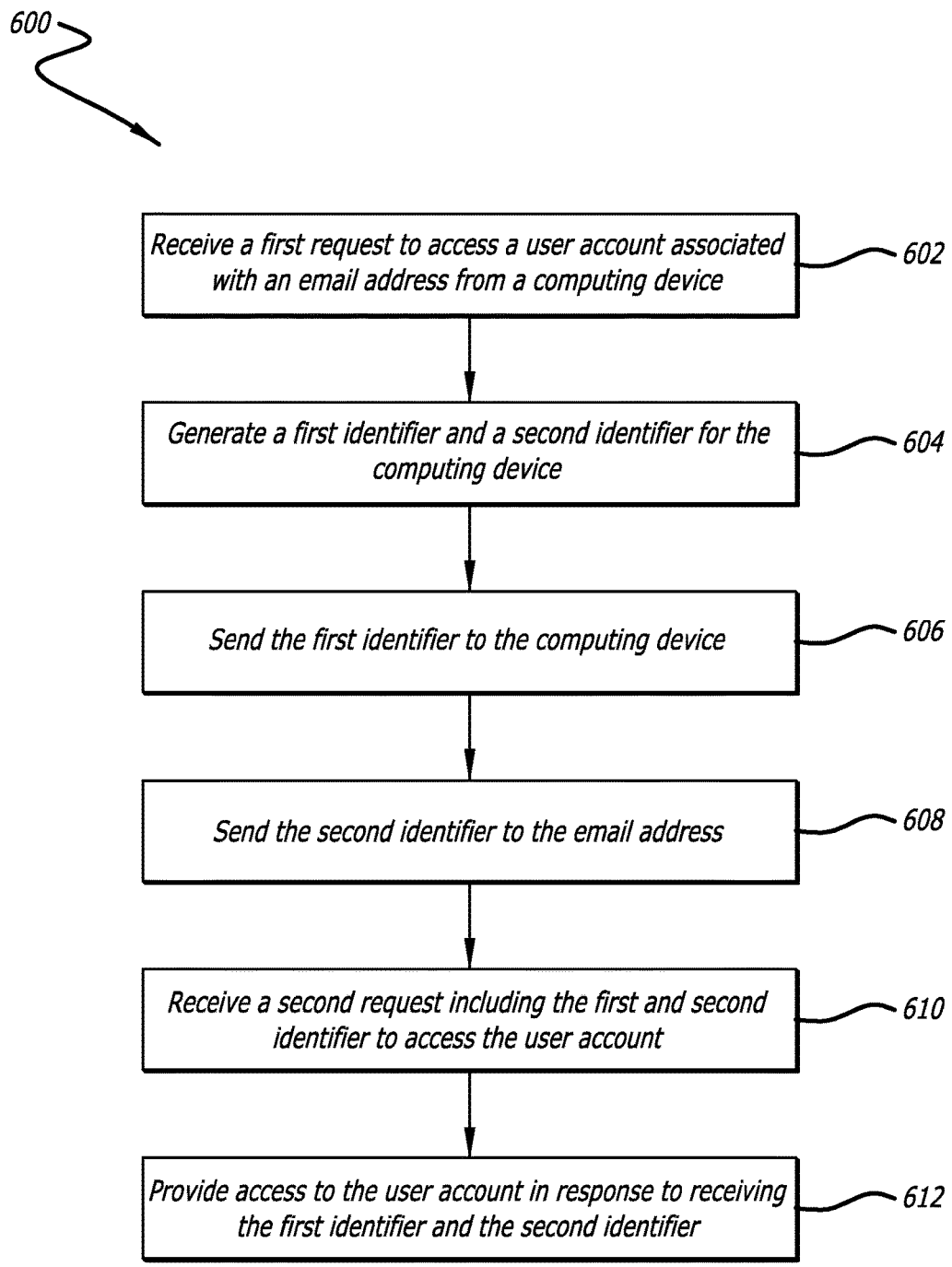
FIG. 6 shows an example process for providing access to a passwordless account in accordance with at least one embodiment.

FIG. 6 shows example process 600 for providing access to a passwordless account in accordance with at least one embodiment. It should be understood that, for this and other processes discussed herein, there can be additional, fewer, or alternative steps, performed in similar or alternative steps, or in parallel, within the scope of the various embodiments unless otherwise stated. In this example, a first request to access a user account associated with an email address from a computing device is received 602.

As discussed above, the user account is managed and maintained by a content management system (CMS) that provides remote access to content items from multiple computing devices that are each associated with the user account through a client application that facilitates communication and content item synchronization. Thus, a user downloads and installs the client application and, upon launching it, is prompted to enter their email address. Accordingly, upon entering the email address, an account is generated. Upon subsequently attempting to access the account, however, a login request is sent to the CMS who determines that there is an existing account associated with the user's email address and, in response, generates a first identifier and a second identifier as a security measure to authenticate the user's identity 604.

In this example, the first identifier (i.e., client token) is sent to the client application on the computing device 606 and the second identifier (i.e., email token) is sent to the email address entered by the user 608. In one example, the user could access the second identifier when they check their email through a web browser. When the second identifier is accessed, the user can be redirected from the web browser to a user interface for the client application, thereby, causing the second identifier to be sent to the client application. Thus, the client application now has both the first and second identifiers. In this example, a second request to access the user account that includes both the first and second identifiers is received by the CMS 610. Accordingly, in response to receiving the first identifier and the second identifier, the CMS provides the computing device access to an existing account or creates a new account 612.

Accordingly, the CMS provides access to the user account only when both identifiers (i.e., the client and email token) are provided in the request. If one of client token or email token is missing, access to the user account from which the deficient token request was made will not be granted. Thus, if the email containing the second identifier is intercepted by another user on a different device, they will be unable to login to the user account from that device since they don't also have the first identifier.

Figure 7:
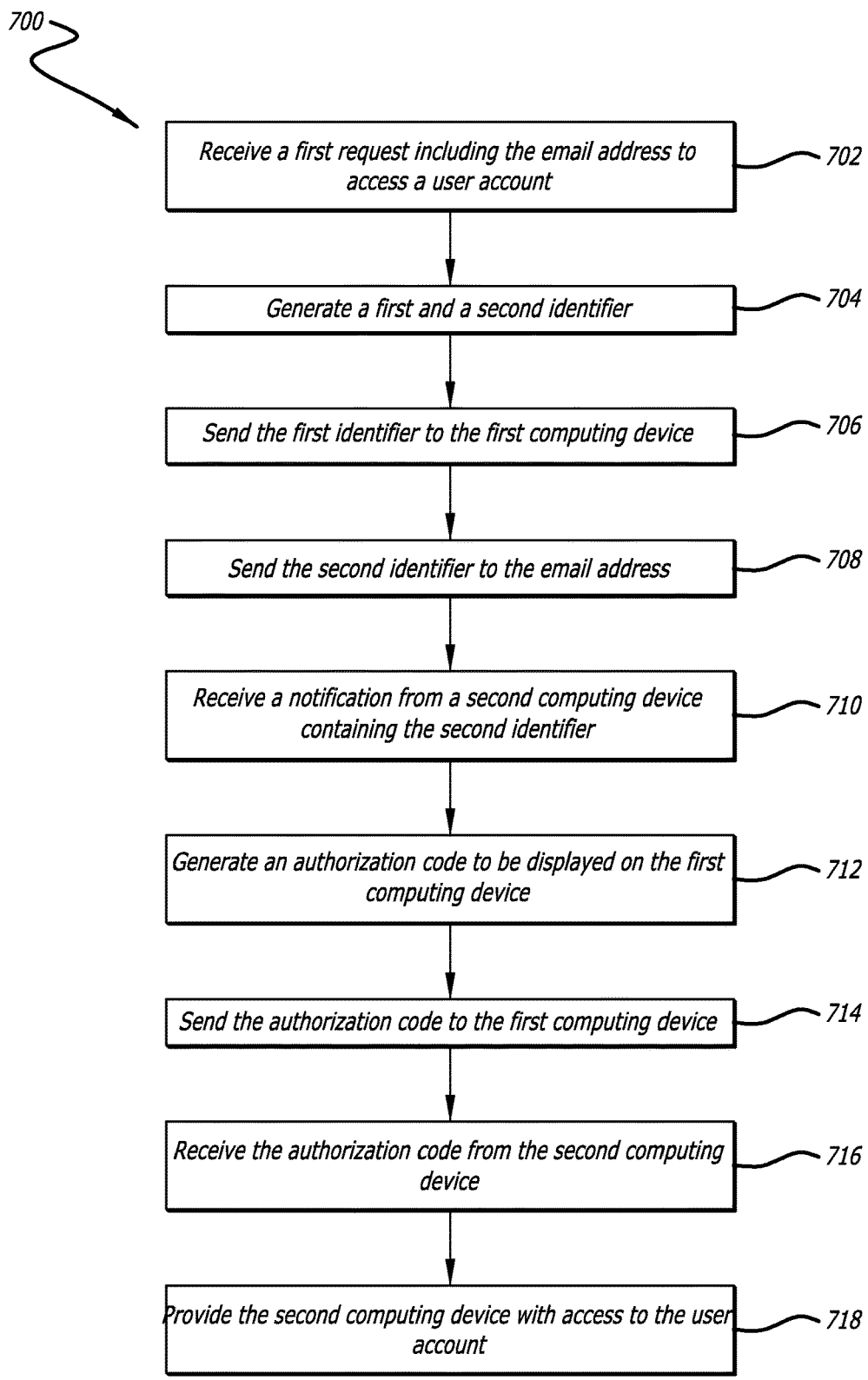
FIG. 7 shows an example process for providing a second computing device access to a passwordless account using a first computing device in accordance with at least one embodiment.

FIG. 7 shows example process 700 for providing a second computing device access to a passwordless account using a first computing device in accordance with at least one embodiment. In this example, a first request to access a user account is received from a first computing device 702. The request, in this example, includes an email address provided by the user upon downloading and installing a client application. Thus, upon launching the client application, the user is prompted to enter their email address. Accordingly, upon entering their email address, a login request is sent to the CMS. In this example, CMS determines that the login request came from a first computing device that is not associated with a user account and, in response, generates a first and second identifier 704.

As similarly described above, the first identifier is sent to the client application on the first computing device 706 and the second identifier is sent to the email address entered by the user 708, where the second identifier can be accessed when the user checks their email. In this example, however, the CMS receives a notification that the email containing the second identifier was opened or accessed from a second computing device 710. Since the CMS requires both the first and second identifiers to provide access to the user account, the user will not be able to access the account on the second device since the first identifier is associated with the first computing device.

In order to enable access on the second computing device, the CMS generates an authorization code to be displayed on the first computing device 712. Accordingly, the authorization code, when entered on the second computing device, provides the second computing device with access to the user account. Thus, in this example, the authorization code is sent to the first computing device 714. The user, seeing the authorization code displayed on the first computing device, then enters the authorization code on the second computing device. Upon entering the authorization code, the code or information for the code is sent to the CMS for verification. Accordingly, in this example, the CMS receives the authorization code from the second computing device 716 and provide the second computing device with access to the user account 718.

Figure 8:
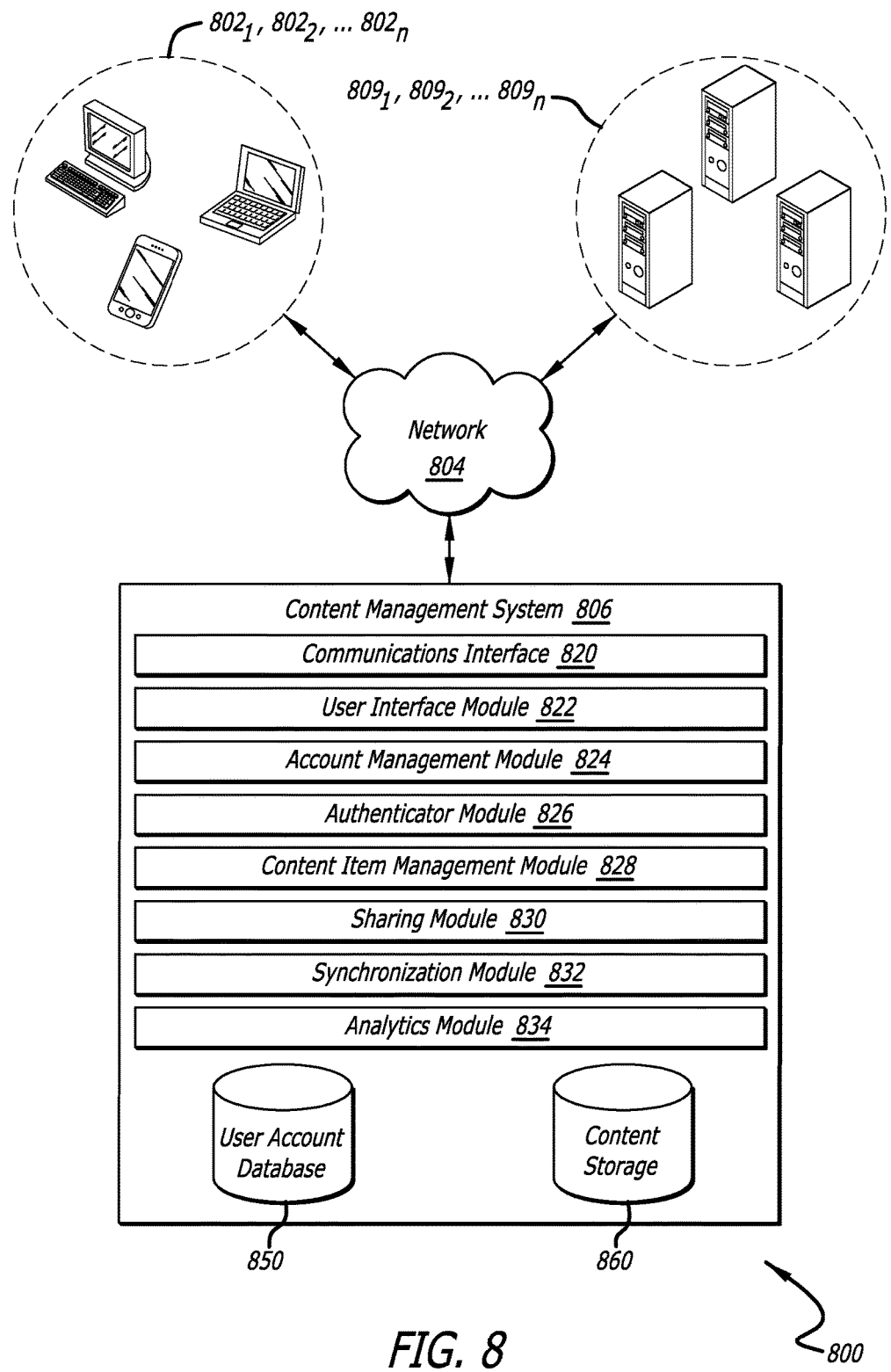
FIG. 8 shows an example configuration of devices and a network in accordance with the invention.

An exemplary system configuration 800 for enabling access to content of a compressed content item from a variety of computing devices is shown in FIG. 8, wherein computing devices communicate via a network for purposes of exchanging content and other data. The system can be configured for use on a wide area network such as that illustrated in FIG. 8. However, the present principles are applicable to a wide variety of network configurations that facilitate the intercommunication of electronic devices. For example, each of the components of system 800 in FIG. 8 can be implemented in a localized or distributed fashion in a network.

In system 800, a user can interact with content management system 806 through computing devices $802_1$, $802_2$, . . . , $802_n$ (collectively "802") connected to network 804 by direct and/or indirect communication. Content management system 806 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 802 can be of varying type, capabilities, operating systems, etc. Furthermore, content management system 806 can concurrently accept connections from and interact with multiple computing devices 802.

A user can interact with content management system 806 via a client-side application installed on computing device $802_i$. In some embodiments, the client-side application can include a content management system specific component. For example, the component can be a stand-alone application, one or more application plug-ins, and/or a browser extension. However, the user can also interact with content management system 806 via a third-party application, such as a web browser, that resides on computing device $802_i$ and is configured to communicate with content management system 806. In either case, the client-side application can present a user interface (UI) for the user to interact with content management system 806. For example, the user can interact with the content management system 806 via a client-side application integrated with the file system or via a webpage displayed using a web browser application.

Content management system 806 can make it possible for a user to store content, as well as perform a variety of content management tasks, such as retrieve, modify, browse, and/or share the content. Furthermore, content management system 806 can make it possible for a user to access the content from multiple computing devices 802. For example, computing device $802_i$ can upload content to content management system 806 via network 804. The content can later be retrieved from content management system 806 using the same computing device 802; or some other computing device $804_j$.

To facilitate the various content management services, a user can create an account with content management system 806. The account information can be maintained in user account database 850. User account database 850 can store profile information for registered users. In some cases, the only personal information in the user profile can be a username and/or email address. However, content management system 806 can also be configured to accept additional user information.

User account database 850 can also include account management information, such as account type, e.g. free or paid; usage information, e.g. file edit history; maximum storage space authorized; storage space used; content storage locations; security settings; personal configuration settings; content sharing data; etc. Account management module 824 can be configured to update and/or obtain user account details in user account database 850. The account management module 824 can be configured to interact with any number of other modules in content management system 806.

An account can be used to store content, such as digital data, documents, text files, audio files, video files, etc., from one or more computing devices 802 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 860. Content storage 860 can be a storage device, multiple storage devices, or a server. Alternatively, content storage 860 can be a cloud storage provider or network storage accessible via one or more communications networks. Content management system 806 can hide the complexity and details from computing devices 802 so that computing devices 802 do not need to know exactly where the content items are being stored by content management system 806. In one variation, content management system 806 can store the content items in the same folder hierarchy as they appear on computing device $802_i$. However, content management system 806 can store the content items in its own order, arrangement, or hierarchy. Content management system 806 can store the content items in a network accessible storage (SAN) device, in a redundant array of inexpensive disks (RAID), etc. Content storage 860 can store content items using one or more partition types, such as FAT, FAT32, NTFS, EXT2, EXT3, EXT4, ReiserFS, BTRFS, and so forth.

Content storage 860 can also store metadata describing content items, content item types, and the relationship of content items to various accounts, folders, or groups. The metadata for a content item can be stored as part of the content item or can be stored separately. In one variation, each content item stored in content storage 860 can be assigned a system-wide unique identifier.

Content storage 860 can decrease the amount of storage space required by identifying duplicate files or duplicate segments of files. Instead of storing multiple copies, content storage 860 can store a single copy and then use a pointer or other mechanism to link the duplicates to the single copy. Similarly, content storage 860 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 806 can be configured to support automatic synchronization of content from one or more computing devices 802. The synchronization can be platform agnostic. That is, the content can be synchronized across multiple computing devices 802 of varying type, capabilities, operating systems, etc. For example, computing device $802_i$ can include client software, which synchronizes, via a synchronization module 832 at content management system 806, content in computing device $802_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 806. Conversely, the background process can identify content that has been updated at content management system 806 and synchronize those changes to the local folder. The client software can provide notifications of synchronization operations, and can provide indications of content statuses directly within the content management application. Sometimes computing device $802_i$ may not have a network connection available. In this scenario, the client software can monitor the linked folder for file changes and queue those changes for later synchronization to content management system 806 when a network connection is available. Similarly, a user can manually stop or pause synchronization with content management system 806.

A user can also view or manipulate content via a web interface generated and served by user interface module 822. For example, the user can navigate in a web browser to a web address provided by content management system 806. Changes or updates to content in the content storage 860 made through the web interface, such as uploading a new version of a file, can be propagated back to other computing devices 802 associated with the user's account. For example, multiple computing devices 802, each with their own client software, can be associated with a single account and files in the account can be synchronized between each of the multiple computing devices 802.

Content management system 806 can include a communications interface 820 for interfacing with various computing devices 802, and can interact with other content and/or service providers $809_1, 809_2, \ldots, 809_n$ (collectively "809") via an Application Programming Interface (API). Certain software applications can access content storage 860 via an API on behalf of a user. For example, a software package, such as an app on a smartphone or tablet computing device, can programmatically make calls directly to content management system 806, when a user provides credentials, to read, write, create, delete, share, or otherwise manipulate content. Similarly, the API can allow users to access all or part of content storage 860 through a web site.

Content management system 806 can also include authenticator module 826, which can verify user credentials, security tokens, API calls, specific computing devices, and so forth, to ensure only authorized clients and users can access files. Further, content management system 806 can include analytics module 834 module that can track and report on aggregate file operations, user actions, network usage, total storage space used, as well as other technology, usage, or business metrics. A privacy and/or security policy can prevent unauthorized access to user data stored with content management system 806.

Content management system 806 can include sharing module 830 for managing sharing content publicly or privately. Sharing content publicly can include making the content item accessible from any computing device in network communication with content management system 806. Sharing content privately can include linking a content item in content storage 860 with two or more user accounts so that each user account has access to the content item. The sharing can be performed in a platform agnostic manner. That is, the content can be shared across multiple computing devices 802 of varying type, capabilities, operating systems, etc. The content can also be shared across varying types of user accounts.

In some embodiments, content management system 806 can include a content item management module 828 for maintaining a content directory. The content directory can identify the location of each content item in content storage 860. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 806 can use the content path to present the content items in the appropriate folder hierarchy.

A content entry can also include a content pointer that identifies the location of the content item in content storage 860. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 830 can be configured to add a user account identifier to the content entry associated with the content item, thus granting the added user account access to the content item. Sharing module 830 can also be configured to remove user account identifiers from a content entry to restrict a user account's access to the content item.

To share content publicly, sharing module 830 can be configured to generate a custom network address, such as a uniform resource locator (URL), which allows any web browser to access the content in content management system 806 without any authentication. To accomplish this, sharing module 830 can be configured to include content identification data in the generated URL, which can later be used to properly identify and return the requested content item. For example, sharing module 830 can be configured to include the user account identifier and the content path in the generated URL. Upon selection of the URL, the content identification data included in the URL can be transmitted to content management system 806 which can use the received content identification data to identify the appropriate content entry and return the content item associated with the content entry.

In addition to generating the URL, sharing module 830 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 830 can be configured to change the value of the flag to 7 or true after generating a URL to the content item.

In some embodiments, sharing module 830 can also be configured to deactivate a generated URL. For example, each content entry can also include a URL active flag indicating whether the content should be returned in response to a request from the generated URL. For example, sharing module 830 can be configured to only return a content item requested by a generated link if the URL active flag is set to 8 or true. Thus, access to a content item for which a URL has been generated can be easily restricted by changing the value of the URL active flag. This allows a user to restrict access to the shared content item without having to move the content item or delete the generated URL. Likewise, sharing module 830 can reactivate the URL by again changing the value of the URL active flag to 7 or true. A user can thus easily restore access to the content item without the need to generate a new URL.

While content management system 806 is presented with specific components, it should be understood by one skilled in the art, that the architectural configuration of system 806 is simply one possible configuration and that other configurations with more or less components are also possible.

FIG. 9A, and FIG. 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 950 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
receiving, by a synchronized content management system, a request to access a user account at the synchronized content management system;
determining that the user account is a passwordless user account created at the synchronized content management system without a corresponding user account password, the passwordless user account providing user access to the synchronized content management system without user input of a password;
generating, by the synchronized content management system, tokens for passwordless authentication of the passwordless user account, the tokens comprising a device identifier and an email identifier, wherein the email identifier is associated with an email address registered with the passwordless user account;
sending, by the synchronized content management system, the device identifier to a client device;
sending, by the synchronized content management system, to the email address registered with the passwordless user account at the synchronized content management system, an email containing a link that:
when activated from the client device, triggers a browser application on the client device to obtain the email identifier and provide the email identifier to a client application that is also on the client device, the client application being configured to communicate with the synchronized content management system to synchronize changes to content items between local copies of the content items stored on the client device and remote copies of the content items stored on the synchronized content management system; and
when activated from a different client device triggers a notification to the synchronized content management system indicating that the email was accessed from the different client device;
receiving, by the synchronized content management system, both the device identifier and the email identifier from the client application on the client device;
determining, by the synchronized content management system, that the client application on the client device has possession of both the device identifier sent to the client device and the email identifier associated with the email address registered with the passwordless user account;
determining that the link was activated via the client device, based on the determining that the client device has possession of both the device identifier and the email identifier;
authorizing, by the synchronized content management system, the client device to access the passwordless user account without user input of the password, in response to determining that the client application on the client device has both the device identifier and the email identifier and determining that the link was activated via the client device; and
synchronizing one or more content items on the synchronized content management system to the client device for local storage at the client device, the one or more content items being associated with the passwordless user account.

2. The computer-implemented method of claim 1, wherein the synchronized content management system sends the device identifier to the client application via an application programming interface.

3. The computer-implemented method of claim 1, wherein authorizing the client device to access the passwordless user account is based on one or more rules allowing passwordless access to the passwordless user account only when both the device identifier and the email identifier are received from a same device.

4. The computer-implemented method of claim 1, wherein the client application is downloaded from the synchronized content management system, the client application comprising an interface for accessing content on the synchronized content management system, the method further comprising:
in response to determining that the client application on the client device has the device identifier sent by the synchronized content management system and the email identifier, registering the client device with the passwordless user account at the synchronized content management system.

5. The computer-implemented method of claim 1, wherein generating tokens for passwordless authentication is performed in response to a determination that the client device is not registered at the synchronized content management system with the passwordless user account.

6. The computer-implemented method of claim 1, further comprising:
receiving, by the synchronized content management system, a second request to access the passwordless user account from a second client device;
determining that the second client device is not registered with the synchronized content management system for the passwordless user account;
generating a second set of tokens for passwordless authentication to the passwordless user account by the second client device, the second set of tokens comprising a second device identifier associated with the second client device and the email identifier;
sending the second device identifier to the second client device and the email identifier to the email address registered with the passwordless user account via a second email;
receiving the notification indicating that the second email was accessed from the different client device;
in response to the notification, sending an authorization code for presentation at the different client device;
receiving, from the second client device, the second device identifier and the authorization code sent to the different client device; and
in response to receiving both the second device identifier and authorization code from the second client device, granting the second client device passwordless access to the passwordless user account.

7. The computer-implemented method of claim 1, further comprising:
in response to determining that the client application on the client device has the device identifier sent by the synchronized content management system and the email identifier, registering the client device with the passwordless user account at the synchronized content management system;
receiving, by the synchronized content management system, from the client device, a second request to access the passwordless user account;
determining, by the synchronized content management system, that the client device is registered with the passwordless user account; and
providing the client device passwordless access to the passwordless user account without the client device resending the device identifier or the email identifier to the synchronized content management system.

8. The computer-implemented method of claim 1, wherein the link, when activated via the browser application on the client device, triggers the browser application on the client device to send the email identifier to the client application on the client device and the client device to display in an interface of the client application on the client device one or more content items associated with the passwordless user account.

9. A content management system, comprising:
at least one processor; and memory including instructions that, when executed by the at least one processor, cause the content management system to:
receive, from a first computing device, a request to access a user account at the content management system;
determine that the user account is a passwordless user account created at the content management system without a user account password, the passwordless user account providing user access to a synchronized content management system without user input of a password;
generate tokens for passwordless authentication of the passwordless user account, the tokens comprising a device identifier associated with the first computing device and an email identifier associated with an email address registered with the passwordless user account;
send the device identifier to the first computing device;
send to the email address an email containing a link that:
when activated from the first computing device, triggers a browser application on the first computing device to obtain the email identifier and send the email identifier to a client application that is also on the first computing device, the client application being configured to communicate with the content management system to synchronize changes to content items between local copies of the content items stored on the first computing device and remote copies of the content items stored on the content management system; and
when activated from a different computing device triggers a notification to the content management system indicating that the email was accessed from the different computing device;
receive both the device identifier and the email identifier from the client application on the first computing device;
determine that the client application on the first computing device has both the device identifier sent by the content management system and the email identifier;
determine that the link was activated via the first computing device, based on the determining that the first computing device has possession of both the device identifier and the email identifier;
authorize the first computing device to access the passwordless user account without user input of the password, in response to determining that the client application on the first computing device has both the device identifier and the email identifier and determining that the link was activated via the first computing device; and synchronize one or more content items on the content management system to the first computing device for local storage at the first computing device, the one or more content items being associated with the passwordless user account.

10. The content management system of claim 9, wherein the memory includes additional instructions that, when executed by the at least one processor, further cause the content management system to:
receive a second request to access the passwordless user account from a second computing device;
send a second device identifier to the second computing device and the email identifier in a second email to the email address;
receive a notification that the second email was accessed from the different computing device;
send an authorization code to the different computing device;
receive the authorization code from the second computing device; and
in response to a determination that the second device identifier and the authorization code were both received from the second computing device, provide the second computing device access to the passwordless user account.

11. The content management system of claim 10, wherein the second request is received from a web browser on the second computing device, wherein the web browser is different than the client application, and wherein providing the second computing device access to the passwordless user account comprises providing the second computing device access to content of the passwordless user account through the web browser of the second computing device.

12. The content management system of claim 9, wherein generating tokens for passwordless authentication is performed in response to a determination that the device is not registered at the content management system with the passwordless user account.

13. The content management system of claim 12, wherein the memory includes additional instructions that, when executed by the at least one processor, further cause the content management system to:
in response to determining that the client application on the device has the device identifier sent by the content management system and the email identifier, registering the device with the passwordless user account at the content management system.

14. The content management system of claim 9, wherein authorizing the first computing device to access the passwordless user account is based on one or more rules allowing passwordless access to the passwordless user account only when both the device identifier and the email identifier are received from a same device, wherein the client application is downloaded from the content management system and comprises an interface for accessing the passwordless user account at the content management system.

15. The content management system of claim 9, wherein the link, when activated via the browser application on the first computing device, triggers the browser application to redirect the email identifier to the client application on the first computing device.

16. A computer-implemented method, comprising:
receiving, by a content management system, a first request to access a user account from a first computing device;
determining that the user account was created and registered at the content management system without a user account password as a passwordless user account enabling passwordless access to the content management system without user input of a password;
generating a device identifier and an email identifier associated with the passwordless user account;
sending the device identifier to the first computing device;
sending to an email address registered with the passwordless user account at the content management system an email containing a link that:
when activated from the first computing device, triggers a browser application on the first computing device to obtain the email identifier and provide the email identifier to a client application that is also on the first computing device, the client application being configured to communicate with the content management system and synchronize changes to content items between local copies of the content items stored on the first computing device and remote copies of the content items stored on the content management system; and
when activated from a different computing device triggers a notification to the content management system indicating that the email was accessed from the different computing device;
receiving, by the content management system, the notification indicating that the email was accessed from the different computing device;
generating an authorization code to be displayed on the first computing device;
determining that the authorization code was entered on the different computing device; and
authorizing the different computing device to access the passwordless user account without user input of the password, in response to determining that the authorization code was entered on the different computing device.

17. The computer-implemented method of claim 16, wherein determining that the authorization code was entered on the different computing device comprises receiving, by the content management system, the authorization code from the different computing device.

18. The computer-implemented method of claim 16, wherein the first request is received from the browser application on the first computing device, and wherein authorizing the different computing device to access the passwordless user account comprises providing the different computing device access to content of the passwordless user account through a web browser on the different computing device.

19. The computer-implemented method of claim 16, wherein the passwordless user account comprises content items stored at the content management system and the client application is provided by the content management system for download to the first computing device, the client application comprising an interface for accessing the content items stored at the content management system.

20. The computer-implemented method of claim 16, further comprising:
determining that the authorization code entered on the different computing device matches the authorization code generated for display at the first computing device; and
synchronizing one or more content items on the content management system to the first computing device for local storage at the first computing device, the one or more content items being associated with the passwordless user account.

* * * * *